United States Patent

[11] 3,605,017

[72] Inventors Allan B. Chertok
Cambridge;
Philip P. Carvey, Boston, both of, Mass.
[21] Appl. No. 831,139
[22] Filed June 6, 1969
[45] Patented Sept. 14, 1971
[73] Assignee EG & G Inc.
Bedford, Mass.

[54] SINGLE SIDEBAND DATA TRANSMISSION SYSTEM
12 Claims, 17 Drawing Figs.

[52] U.S. Cl. .................................................. 325/38, 325/40, 325/49, 325/60
[51] Int. Cl. .................................................. H04b 1/68
[50] Field of Search .................................................. 179/15 BC; 325/49, 50, 59, 60, 136, 137, 138, 38, 40, 42; 178/66, 68; 328/27, 37, 55; 332/45

[56] References Cited
UNITED STATES PATENTS

| | | | |
|---|---|---|---|
| 2,895,009 | 7/1959 | Busignies | 325/59 X |
| 3,337,863 | 8/1967 | Lender | 178/68 X |
| 3,406,344 | 10/1968 | Hopper | 325/50 |
| 3,522,537 | 8/1970 | Boughtwood | 325/49 |

*Primary Examiner*—Benedict V. Safourek
*Attorneys*—Ralph L. Cadwallader and Lawrence P. Benjamin

ABSTRACT: A system for transmitting binary data along band limited transmission channels in which digital transversal networks are used to generate, in response to binary bits to be transmitted, a series of doublet symbols and simultaneously a series of Hilbert transforms of the doublet symbols. The outputs from the two transversal networks, together with quadrature related offset carriers, are used to modulate quadrature related carrier signals of identical frequency to produce single-sideband suppressed carrier transmission signals including an offset pilot tone. The receiver decoder includes means responsive to the transmitted pilot tone for correcting the locally generated carrier frequency for phase jitter and phase translation introduced in the transmission channel. The receiver also includes a phase lock system for correcting phase uncertainties in the receiver arising from the pilot tone filter and from the phase of the locally generated offset carrier.

INVENTORS
ALLAN B. CHERTOK
BY PHILIP P. CARVEY
Kenway, Jenney & Hildreth
ATTORNEYS

INVENTORS
ALLAN B. CHERTOK
PHILIP P. CARVEY

BY Kenway, Jenney & Hildreth
ATTORNEYS

INVENTOR
ALLAN B. CHERTOK
BY PHILIP P. CARVEY
Kenway, Jenney & Hildreth
ATTORNEYS INVENTORS
ALLAN B. CHERTOK
PHILIP P. CARVEY
BY Kenway, Jenney & Hildreth
ATTORNEYS INVENTOR
ALLAN B. CHERTOK
PHILIP P. CARVEY
BY Kenway, Jenney & Hildreth
ATTORNEYS INVENTORS
ALLAN B. CHERTOK
PHILIP P. CARVEY
BY
Kenway, Jenney & Hildreth
ATTORNEYS INVENTORS
ALLAN B. CHERTOK
BY PHILIP P. CARVEY
Kenway, Jenney & Hildreth
ATTORNEYS INVENTOR
ALLAN B. CHERTOK
PHILIP P. CARVEY
BY Kenway, Jenney & Hildreth
ATTORNEYS

SINGLE SIDEBAND DATA TRANSMISSION SYSTEM

FIELD OF THE INVENTION

This invention relates in general to data transmission and more particularly to a data transmission system for transmitting binary data over limited bandwidth channels at any one of a number of different data rates and carrier frequencies.

BACKGROUND OF THE INVENTION

In the transmission of binary data over limited bandwidth channels, a number of different techniques have been employed, depending upon factors such as the economics, the available bandwidth and the amount of error which can be tolerated. In one relatively conventional technique, a baseband signal, having modified sin X/X form is generated, used to modulate a carrier and is transmitted as a vestigial sideband modulated signal. While transmitting a single-sideband, suppressed carrier signal is more efficient in the use of channel bandwidth, the amount of low frequency energy in the modified sin X/x symbol spectrum makes it difficult to implement a single sideband translation. Typically with vestigial sideband modulation and a modified sin X/x symbol, the transmission of data at a rate $F_D$ occupies a bandwidth of $F_D$.

One method of reducing the bandwidth required for transmission of binary digits is described in U.S. Pat. No. 3,388,330. In that patent there is described a technique for the synchronous superposition of band limited doublet pulses in which two sin X/x components of opposite polarity are spaced at two symbol intervals. The resulting spectrum for these symbols either alone or in random superposition is symmetrical and has a bandwidth of one-half $F_D$ where the symbol interval, is one/$F_D$. There is no DC component, thereby allowing for AC coupling in many of the components of the modulation system. Since the doublet symbol has a smooth high pass roll off characteristic, no DC component, and attenuation of the low frequencies, isolation of the lower sideband can be achieved with a moderately complex filter having precise amplitude and phase characteristics. Using this method a single-sideband suppressed carrier signal for transmission can be generated.

If, however, there a number of data rates to be accommodated within the same equipment, filter complexities increase and become essentially impractical for a system employing several different data rates. One usual data rate for operation over AT & T schedule 3002 voice bandwidth telephone channels conditioned to C2 transmission objectives, is a rate of 4,800 binary digits (binits) per second. However, if it is desired to transmit data over narrower bandwidth channels without this conditioning, transmission rates down to 1,800 and 1,200 binits per second may be required. In addition, in order to approximately center the transmission spectrum within the channel, some variation in the carrier frequency is required. Thus, the implementation of a data transmission system employing the doublet symbol with a number of different data rates requires, using conventional techniques, relatively expensive and complicated filtering systems.

SUMMARY OF THE INVENTION

Broadly speaking, the present invention utilizes the doublet symbol described in the U.S. Pat. No. 3,388,330, to modulate any one of three different carrier frequencies, producing single sideband suppressed carrier signals for transmission over band limited channels. The doublet symbols are synthesized by means of a digital transversal network which can be operated at any one of a selected number of data rates. The single sideband modulation is achieved by a phase cancellation technique in which a second digital transversal network is arranged to generate, as an output, a waveform which is the Hilbert transform of the doublet symbol. The outputs from the two transversal filters are then used to modulate quadrature related carriers in balanced modulators and the outputs of these modulators are summed and passed through a low pass filter to the transmission channel. Quadrature related offset carriers are included with the baseband and quadrature baseband signals to produce a lower sideband component at a frequency below that of the signal spectrum. This component is used as a pilot tone both for a coarse automatic gain control reference and to communicate channel frequency translation and phase jitter to the receiver recovery system.

In order to preserve the integrity of the time domain characteristics of the baseband data signal, the received single sideband (SSB) signal spectrum must be translated to baseband by synchronous demodulation. To produce this demodulation without distortion requires, at the receiver, the synthesis of a local carrier frequency of precisely controlled phase and frequency. As will be explained in more detail below, the pilot tone provides a basis for correcting this locally generated carrier for channel phase jitter and phase translation from the channel. The pilot tone cannot, however, correct for phase uncertainty introduced by the pilot recovery filter in the receiver and for the phase uncertainty introduced by the locally generated offset carrier frequency. To correct for these latter errors, the receiver includes a phase-locking system, in which the phase of the locally generated carrier signal is servoed to maximize the clustering of data signal zero crossings after demodulation.

Using this system over a typical AT & T 3002 channel, conditioned to C2 objectives, should provide for an error probability of $1\times10^{15}$, transmitting data at a data rate of 4,800 binits/second with a carrier frequency of 3,000 Hz. The same equipment may be used, with different clocking signals, to transmit data at rates of 4,200, 3,600, 3,000, 2,400, 1,800 and 1,200 binits per second. In order to approximately center the transmission spectrum in the transmission channels the carrier frequency may be selected to be 3,000 Hz., 2,700 Hz. or 2,400 Hz.

DESCRIPTION OF PREFERRED EMBODIMENTS

Figure 1A:
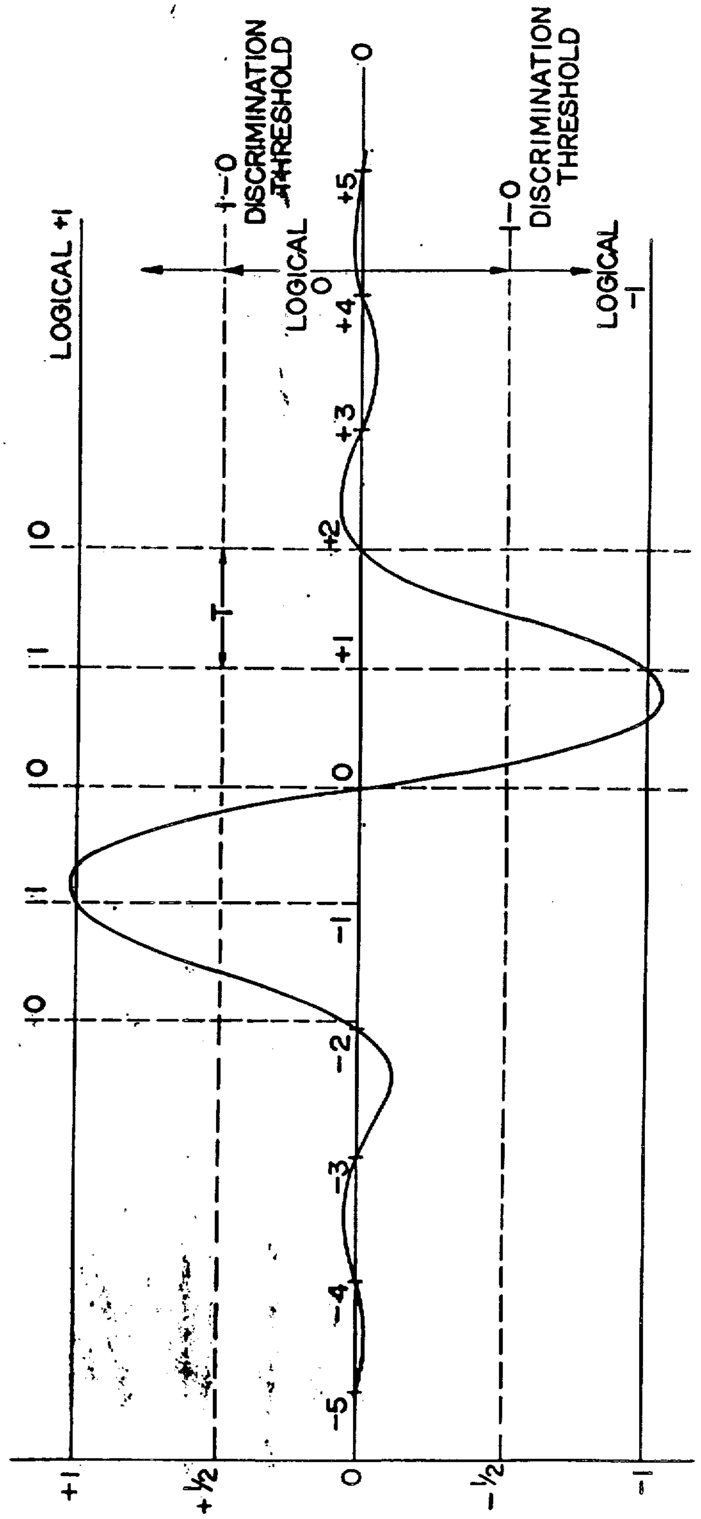
FIGS. 1*a* and 1*b* are illustrations in graphical form of the characteristics of the baseband symbol waveform used in the practice of this invention.
Figure 1B:
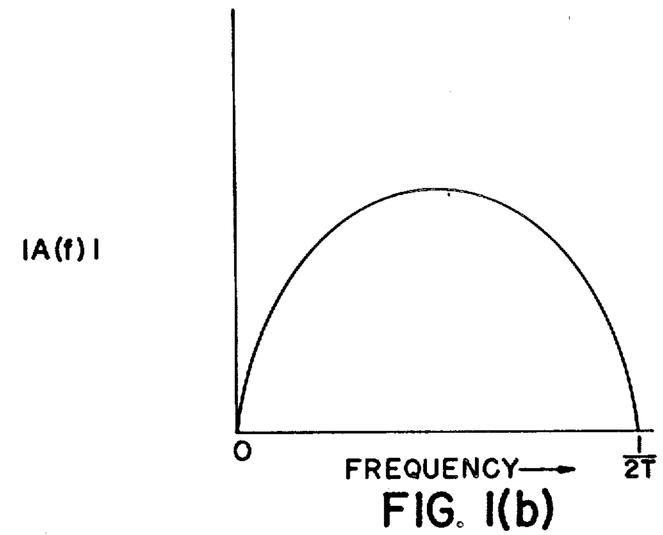

In FIG. 1*a* there is illustrated the baseband symbol in the time domain. The frequency spectrum of the symbol of FIG. 1*a* is illustrated in FIG. 1*b*.

In the time domain, the symbol has the form $$S(t)=1/2\left[\sin\frac{\pi(T+t)}{\pi(T+t)}-\sin\frac{\pi(T-t)}{\pi(T-t)}\right]$$

when $t$ is the instantaneous time, and $T$ is the signalling interval. The waveform is such that it has primary zero crossings at intervals of $2T$, and has a value of ±1 midway between zero crossings. Thus the superposition of a series of these symbols can be arranged to produce at each interval, $T$, either a zero or a ±1 output. If a series of superposed symbols of this form are used to form the baseband signal, then this series may be decoded with a simple two level slicer, providing a binary output indicating whether the waveform has a zero level or a ±1 level.

In the frequency domain, the spectrum of the symbol extends from zero to a frequency, one-half T with a symmetrical shape. Thus, for a 4,800 bits per second data rate, the bandwidth required is 2,400 Hz.

A single-doublet symbol, as illustrated in FIG. 1*a*, when detected with a set of amplitude discriminators which recognize the signal as either being a logical zero level or a logical 1 level, represents a digital data series of 01010. If a second doublet symbol is combined with the first, but spaced an interval T later, then the resultant superposed waveform represents a series of digital data 011110. In order to reproduce a series of digital data signals by a series of superposed symbols of this form, the original data series must first be converted into a second series indicating whether or not, at each interval T, a new symbol is to be superposed. If the original data sequence is represented as $a_1$, $a_2$...$a_n$, then the series for controlling the generation of the data symbols may be represented as $b_n=(a_n+b_{n\pm 2})$ mod 2.

Figure 2:
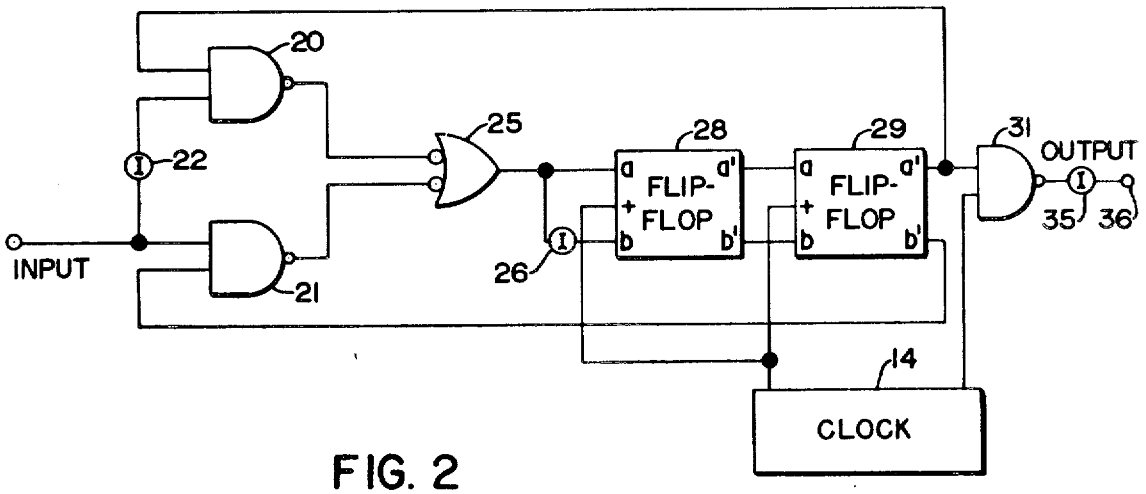
FIG. 2 is an illustration in block diagrammatic form of a precoder for use in a modulation system formed in accordance with the principles of this invention.

A unit for performing the function of the precoder is illustrated in FIG. 2. The data into this precoder, in the form of a binary series, $a_1$, $a_2$...$a_n$ is converted into a digital output train for controlling the symbol generator, with the digital output train in the form $b_1$, $b_2$...$b_n$. The data input is applied directly to one input leg of a NAND gate 21 and also through inverter 22 to one input leg of a second NAND gate 20. The outputs from NAND gates 20 and 21 are both coupled as inputs through NAND gate 25. NAND gate 25 has the inversion at its inputs rather than at its output. The output from gate 25 is connected directly to the a input of flip-flop 28 and through an inverter 26 to the *b* input of the same flip-flop. A second flip-flop 29 has its a input connected to the *a'* output of flip-flop 28 and its *b* input connected to the *b '* output of flip-flop 28. Both flip-flops 28 and 29 are supplied with a triggering input from clock 14. The *a'* output of flip-flop 29 is connected back as the second input leg through NAND gate 20 and the *b'* output from flip-flop 29 is connected back as the second input leg to NAND gate 31 which is provided with signals from the clock 14 for its second input. The output from NAND gate 31 is connected through an inverter to the output terminal 36 of the decoder.

The operation of this circuit then depends upon both the value of a digit provided at the data input and the state of the second flip-flop 29. If the *a'* outputs from flip-flops 28 and 29 are regarded as a ones output and the *b'* outputs are regarded as a zeros output, then it can be shown that, for each bit of input data, the output signal will be that expressed by the formula, $b_n=(a_n+b_{n\pm 1})$ mod 2'.

Figures 3A, 3B:
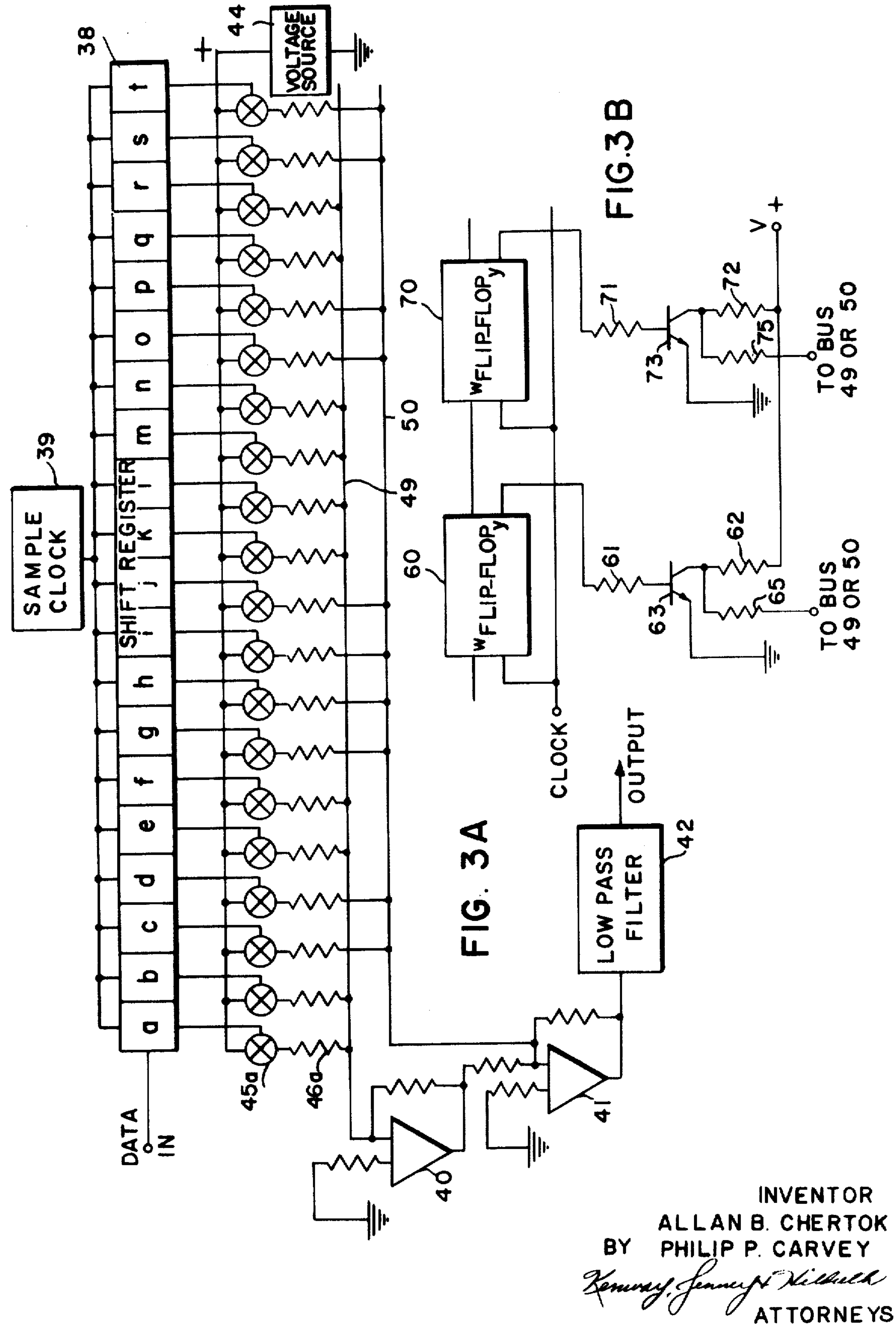
FIG. 3*a* is an illustration in block diagrammatic form of a symbol generator constructed in accordance with the principles of this invention.
FIG. 3*b* is a detailed block diagram of a portion of FIG. 3*a*.

The doublet symbols are synthesized in response to signals from the precoder by means of the digital transversal network illustrated in FIGS. 3*a* and 3*b*. FIGS. 3*a* and 3*b* illustrate a specific embodiment of a symbol generator producing a staircase approximation to the waveform illustrated in FIG. 1*a*. In FIG. 3*a* the overall arrangement of the symbol generator is illustrated and in FIG. 3*b*, a detailed diagram of the units which are reiterated to form the overall apparatus is shown. In general, the symbol generator consists of a shift register which is clocked by a clock 39 providing output pulses at a specific sampling rate, which is an integer multiple of $F_d$. Each of the stages of the shift register are connected as a control signal to a corresponding one of a series of switches 45. Each of the switches 45 are connected to a voltage source 44 so that, when actuated, current is passed from the voltage source 44 through one of a series of resistors 46. Some of the series of resistors 46 are connected to a bus 49 and the remainder are connected to a bus 50. The bus 49 is connected as the input to amplifier 40 and the bus 50 is connected together with the output from the amplifier 40 as the input to an amplifier 41. The output from amplifier 41 is coupled through low-pass filter 42 to the output. The input data from the precoder is applied as an input to the first stage of the shift register.

The operation of this generator provides the staircase approximation of the signal symbol only when a one is present on the data input terminal. Thus, if a one is present on the input data terminal, on the first clock pulse this one will be entered into section a of the shift register thus actuating the corresponding switch 45*a* and passing current through resistor 46*a* to bus 49. Each successive clock pulse will shift this one through the sequence of sections *b*, *c*, *d*, etc. of the shift register, sequentially actuating each of the corresponding switches and providing current through each of the connected resistors. The amplifiers 40 and 41, then sum the total currents present at any one time. In the generator shown, the sample clock rate is twice the data rate and a complete waveform, as shown in FIG. 1*a*, which includes 10 intervals T, requires twice that many, or 20 stages. The values of each of the series of resistors 46 are selected to be inverse to the size of the signal required to generate the staircase approximation to the symbol at the respective point in the waveform. As will be discussed below a sample rate of $4F_D$ is preferred, however, the apparatus is shown for convenience of illustration with 10 intervals and a clock rate of $2F_D$. With a sample rate of $4F_d$ a 10 interval wave would require 40 shift register stages. Since the symbol utilized has both positive and negative values, then the summing resistors must be capable of providing a weighted signal of both polarities. This is the purpose of the second bus 50. Since the currents summed in this bus are applied directly to the input of amplifier 41 and thus undergo one less inversion than the currents supplied as the input to amplifier 40, the signals from this bus are of opposite polarity from those generated in bus 49. The resistors are connected to the appropriate bus to produce the correct polarity at the respective points in the waveforms. The relative values for each of the resistors $46_a$ through $46_u$ are shown in table I for a 20 stage generator utilizing a sample clock rate of $2F_D$.

TABLE I

| Element | Resistance in ohms |
|---|---|
| 46*a* | 49.9 |
| 46*b* | 39.2 |
| 46*c* | 30.1 |
| 46*d* | 22.1 |
| 46*e* | 15.0 |
| 46*f* | 9.31 |
| 46*g* | 4.75 |
| 46*h* | 1.30 |
| 46*i* | 1.00 |
| 46*j* | 2.15 |
| 46*k* | 2.15 |
| 46*l* | 1.00 |
| 46*m* | 1.30 |
| 46*n* | 4.75 |
| 46*o* | 9.31 |
| 46*p* | 15.0 |
| 46*q* | 22.1 |
| 46*r* | 30.1 |
| 46*s* | 39.2 |
| 46*u* | 49.9 |

In FIG. 3*b* the details of a shift register section and switching arrangement suitable for use in a system as illustrated in FIG. 3*a* are shown. The shift register is formed of a series of connected flip-flops, as illustrated at 60 and 70. Each of these flip-flops has a triggering input signal from a clock to triggering input $t$ and also has a signal input, $w$. A one on the signal input, $w$, results, upon the application of a triggering pulse to input $t$, in the transfer of a one to the next connected flip-flop input, $w$, and also provides an actuating signal on its output terminal $y$. For stage 60, the output terminal $y$ is connected through a resistor 61 to the base of a switching transistor 63. The collector of switching transistor 63 is connected to the positive voltage +V through resistor 62. The collector is also connected through the associated current weighting resistor 65 to one of the buses 49 or 50. A one on the $w$ input drives output $y$ low which renders the transistor 63 nonconductive. The collector potential then rises and drives current through resistor 65.

There are tow significant parameters involved in the design of this symbol generator; first, the epoch of bit intervals over which the doublet symbol must be synthesized, and secondly, the required sample rate. The doublet symbol is band limited and is therefore of infinite duration. Synthesizing the waveform only over ten intervals is analytically equivalent to multiplying the infinitely long doublet function by a truncation function F($t$).

$F(t)=1 \quad -5<t<+5T$ $F(t)=0 \quad t>+5T,\ t<-5T$ where T is the signaling interval.

Multiplication of the time domain functions produces a signal spectrum which is the convolution of the truncating function spectrum with the band limited spectrum of the doublet symbol. The result of this convolution is given:

$|S^*(w)|=\sin(w)\,[Si\{T(\pi-w\}+Si\{T(\pi+w)\}]$ where $S^*(w)$ = spectrum of truncated symbol $Si$ = *Sine integral function. For an infinite epoch the spectrum of the truncated symbol is the same as the spectrum of the untruncated doublet. The truncation has two effects. It introduces some amplitude distortion over the bandwidth of the doublet spectrum and it introduces some spectral components outside this bandwidth. If the inband signal power (in the region* 0 to 1/2T Hz.) calculated in the presence of amplitude distortion due to truncation is compared with the signal power calculated without truncation distortion, the difference may be considered as self-noise power. For an epoch of 10 intervals, which is that selected for the present embodiment, the self-noise power is 23.5 db. below the inband signal power. For this same ten interval epoch, the out-of-band power is 30 db. below the inband power.

The spectrum of this doublet consists of the baseband spectrum of the truncated continuous doublet symbol function plus double sideband translations of the baseband about multiples of the sampling rate, $F_s$. As above-mentioned, the sampling rate must be an interger multiple of the data rate. The sampling rate must be such that the first lower sideband is far enough away from the baseband to permit isolation of the baseband by a low-pass filter, such as that illustrated in FIG. 3 at 42. In a system employing only a single data rate, the sampling rate could be, as shown in FIG. 3, $2F_d$. However, in the design described herein, the data rate $F_D$, may be any value from 4,800 bits per second down to 1,200 bits per second. In order to accommodate this range with a single low-pass filter, a sampling rate of $4F_D$ is preferred. Under these circumstances the lowest sideband frequency to be stopped by the filter is $$F_{stop_{min}}=4F_{D_{min}}-\frac{F_{D_{min}}}{2}=\frac{7F_{D_{min}}}{2}$$

where $F_{stop_{min}}$ = lowest sideband frequency $F_{D_{min}}$ = lowest data rate. If the minimum data rate is 1,200 bits per second then $F_{stop_{min}}$ =4,200 Hz. The highest data rate is 4,800 bits per second and, at this data rate the spectrum extends up to 2,400 Hz. Thus, the filter 42 must be capable of passing all signals below 2,400 Hz. and effectively stopping signals from 4,200 Hz. up. Filters are available which are down by only 1db. at 2,400 Hz. and provide approximately 30 db. attenuation at 4,200 Hz.

Figure 4:
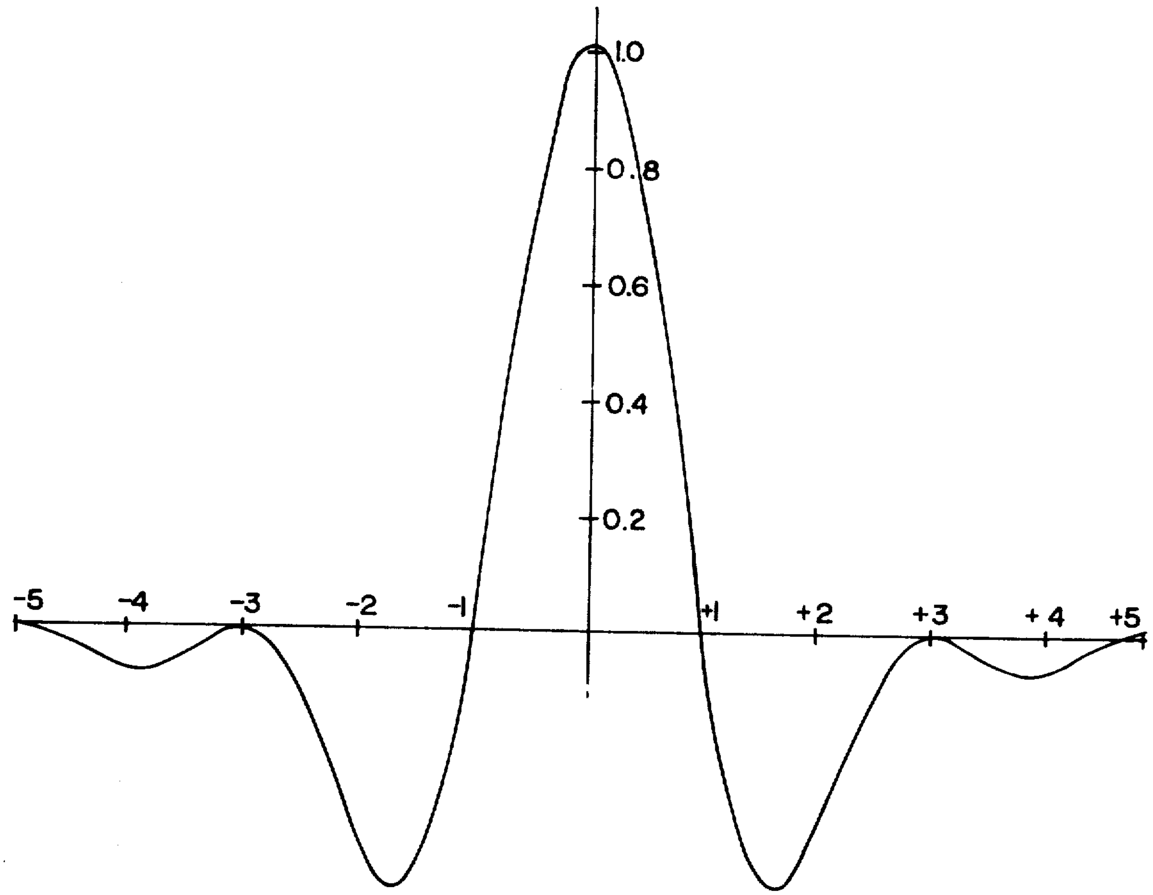
FIG. 4 is an illustration in graphical form of a waveform which is the Hilbert transform of the waveform illustrated in FIG. 1*a*.

Two classical methods of the isolation of a single sideband in an amplitude modulation system are; the use of filters, and phase cancellation techniques. Balanced amplitude modulation of a carrier with the doublet signal illustrated in FIG. 1 produces a double sideband with no carrier component and attenuated spectral components flanking the carrier frequency, permitting isolation of the lowest sideband with a filter having precise amplitude and phase characteristics. Where only a single data rate and carrier frequency is to be employed, the cost of such a filter network may be reasonable. However, for a multiple data rate system a number of such filters is required with design complexity increasing at lower data rates. In the preferred embodiment to be described a single sideband is isolated by means of a phase cancellation technique. In this technique a digital symbol generator, identical in construction to that used for generating the doublet symbol is used to generate the Hilbert transform of this doublet symbol simultaneously with the generation of the doublet symbol itself. Where the sample rate for the doublet symbol generation is $4F_D$, then the sample rate for the Hilbert transform symbol generation will be $4F_D$. In FIG. 4, the Hilbert transform of the doublet symbol is graphically illustrated. It should be noted that the resistor values in the symbol generator, which control the amount of current summed at each particular stage must be adjusted to produce this waveform output. While two entirely separate symbol generators may be employed, an alternative design would utilize the shift register 38 for both symbol generators, each stage providing actuating signals to the transistor switches of different sets of summing circuits. Since the Hilbert transform of the doublet has the same spectral power distribution as the doublet itself, the truncation function introduced by the shift register generator produces the same in-band and out-of-band and distortions as it does for the doublet.

Figure 5:
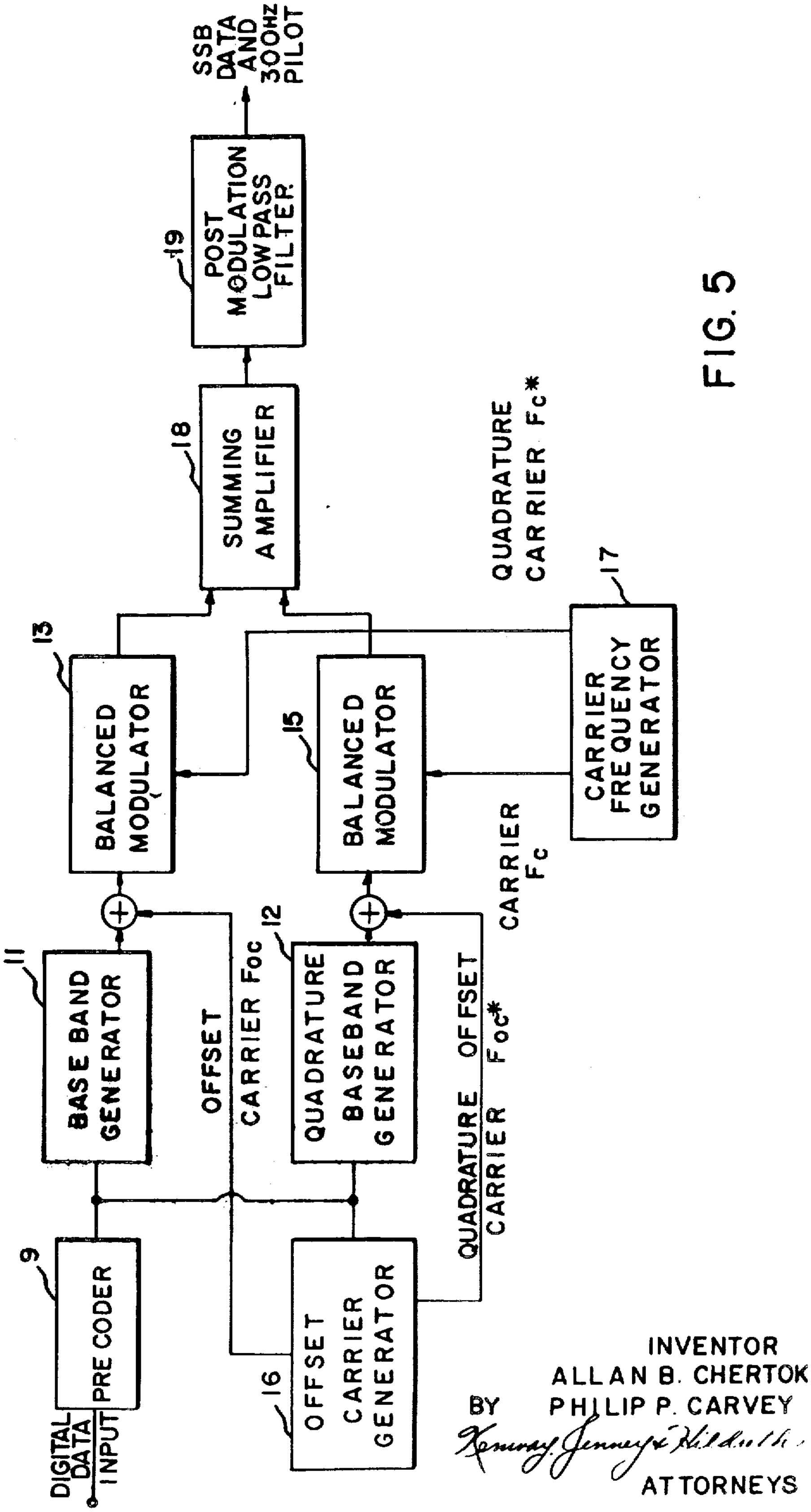
FIG. 5 is an illustration in block diagrammatic form of a modulating system for use in the practice of this invention.
Figure 6A:
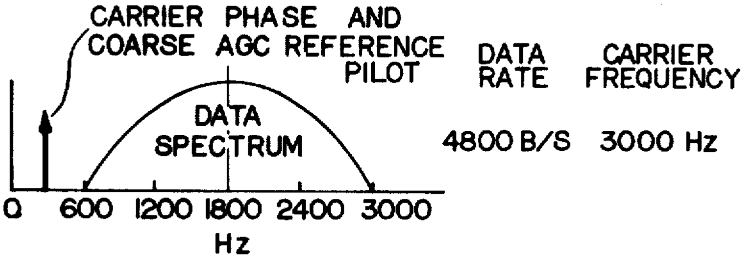
FIGS. 6*a*, *b*, *c*, *d*, *e*, *f* and *g* are graphical illustrations of the spectral characteristics of data transmission signals at different data rates in accordance with the teachings of this invention.
Figure 6B:
Figure 6C:
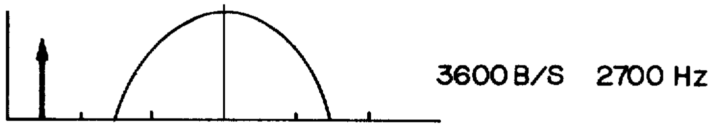
Figure 6D:
Figure 6E:
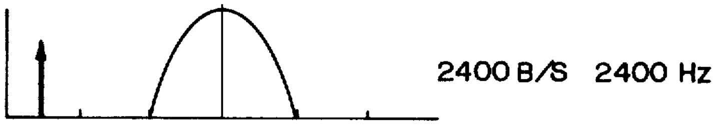
Figure 6F:
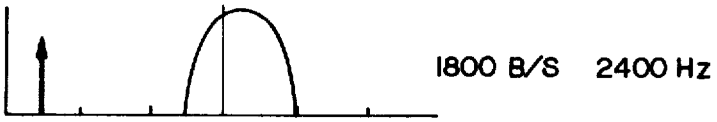
Figure 6G:
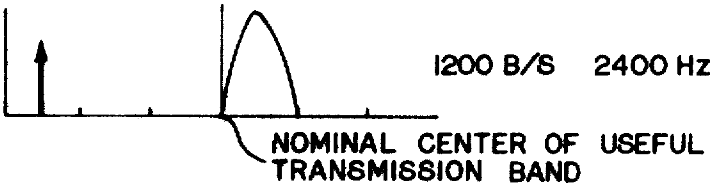

In FIG. 5 there is illustrated a phase cancellation modulation system for generating a single sideband data signal. The modulator includes the precoder 9 actuating a baseband generator 11 and a separate quadrature baseband generator 12. The output of the baseband generator 11, which is the series of superposed doublet symbols is supplied as one modulating input to a balanced modulator 13 which receives a quadrature carrier $F^*_C$ from a carrier frequency generator 17. A second modulating input, $F_{OC}$, is supplied to the balanced modulator 13 from the offset carrier generator 16. The balanced modulator 15 receives one modulating input from the quadrature baseband generator 12, which generates the Hilbert transform of the doublet, and a second modulating input, $F^*_{OC}$ from the offset carrier generator 16. The carrier frequency to this balanced modulator 15 is supplied directly from carrier frequency generator 17. The outputs of the balanced modulator 13 and 15 are summed in summing amplifier 18 and transmitted to the transmission channel through a post modulation low pass filter 19.

The precoder 9 is, as described earlier, a logical unit for generating a series of binary signals controlling the baseband generators from the original binary series. The baseband generator 11 and the quadrature baseband generator 12 are of the form earlier described, with the baseband generator 11 generating the doublet symbol for each logical 1 supplied to its input, while the quadrature baseband generator 12 generates the Hilbert transform of this doublet for each logical 1 input. The carrier $F_C$ from the carrier frequency generator 17 is supplied to modulator 15 with a quadrature carrier $F^*_c$ being supplied to the modulator 13. The purpose of the offset carriers $F_{OC}$ and $F^*_{OC}$ is to generate a pilot signal to provide both rough AGC control and corrections for frequency translation and phase jitter introduced by the transmission channel.

The post modulation low-pass filter 19 serves only to isolate the transmission spectrum and does not shape it. As indicated earlier the filter requirements are not stringent even for a range of data rates from 4,800 to 1,200 bits per second. Because the filter is only an isolating filter, the carrier frequency can be shifted over s small range thereby enabling the transmission spectrum to be approximately centered in the channel. In FIGS. 6a through 6g there are illustrated the single-sideband spectra for the range of data rates and carrier frequencies utilized in this embodiment. As illustrated in FIGS. 6a through 6g the pilot signal is at approximately 300 Hz. which is the amount of offset introduced. The basis for selecting this frequency for the pilot tone and the manner in which it is employed in the demodulation system for recovery of the carrier phase will be described in more detail below.

The single-sideband signal spectrum received from the transmission line must be translated to baseband in a synchronous demodulation system in order to preserve the integrity of the time domain characteristics of the baseband data signal. In order to provide this demodulation the locally generated carrier frequency must have a precisely controlled phase. However, the synthesis of a demodulating carrier of the precise phase relationship to the received signal spectrum must correct for two general sources of phase uncertainty. One such source is the phase uncertainty introduced by the transmission channel and this includes both frequency translation and phase jitter. The other source is phase uncertainty introduced by the carrier synthesizer. In AT & T 3002 channels conditioned to C-2 objectives, the frequency translation should be less than ±5 Hz. Expressed as a dynamic phase disturbance, a 5 Hz. translation amounts to a constant phase drift of 1,800° per second. This same AT & T channel limits phase jitter to 15° peak to peak which usually occurs at rates below 120 Hz. typically 20 Hz.

Figure 7:
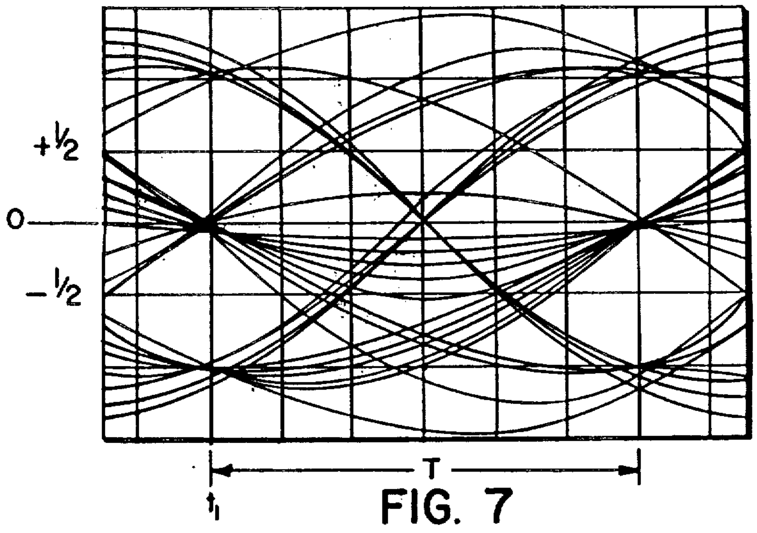
FIG. 7 is an illustration of a graphical representation of superposed oscilloscope waveforms helpful in an understanding of this invention.
Figure 8:
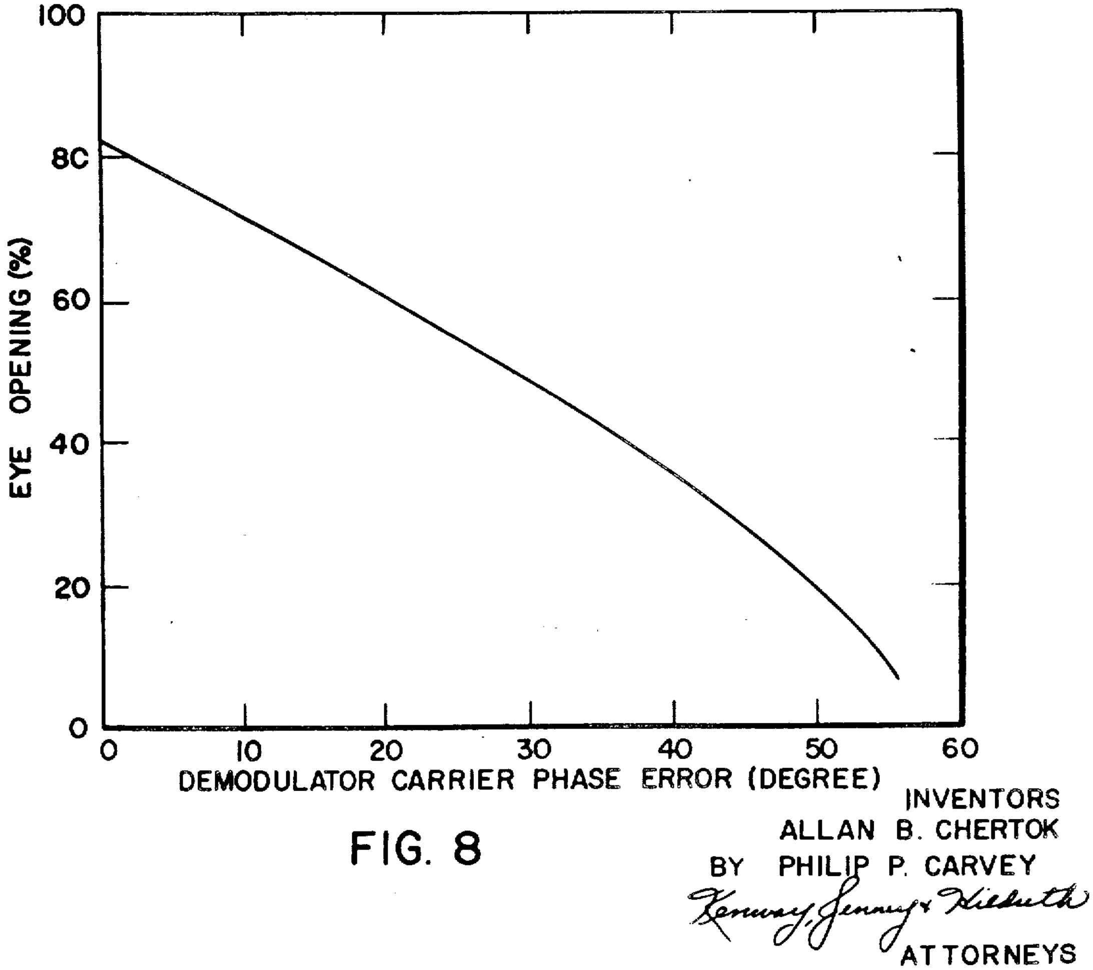
FIG. 8 is an illustration in graphical form of error characteristics of a transmission system constructed in accordance with the principles of this invention.

The significance of these phase errors on the accuracy of the recovered binary signal train is better understood from the consideration of the waveforms produced by the demodulation scheme. In FIG. 7 there is illustrated an "EYE" pattern resulting from observation of a random superposition of the demodulated doublet symbols on an oscilloscope synchronized by a clocking signal in synchronism with the clocking signal controlling the generation of the doublet symbols. At a time $t_i$ the data signal has either a zero value or a ±1 value. The eye opening in the pattern has both horizontal and vertical breadth with the result that at times slightly removed from $t_i$, the amplitude of the signals may still be categorized as either zero or ±1, depending upon the amplitude level which will be acceptable as defining a ±1. By setting amplitude slicers at the widest point of the eye opening at levels +one-half and −one-half, a larger error in the time $t_i$ categorized as either zero or ±1, depending upon the amplitude level which will be acceptable as defining a ±1. By setting amplitude slicers at the widest point of the eye opening at levels +one-half and −one-half, a larger error in the time $t_i$ may be tolerated. The introduction of phase errors in the recovery process results in closure of this eye pattern with a resultant reduction in the margin against noise in translating the waveforms into binary digits. In FIG. 8 the degradation of eye opening as a function of phase error in the demodulating carrier is shown. As there indicated, for small errors in phase, the loss of margin against noise is approximately 1db. per 10° of phase error.

The first source of carrier phase uncertainty is corrected for in this embodiment by the inclusion of a pilot tone with the transmitted data band signal. The usual technique for correcting channel introduced phase uncertainty is the transmission of a pilot signal at the carrier frequency and separating this pilot signal by use of a narrow band filter. This technique is, however, not entirely satisfactory when dealing with the phase jitter because if the filter includes sufficient bandwidth to recover the phase jitter it will capture excessive data spectrum power. Additionally, such an arrangement would require separate filters for each different carrier frequency employed. The use of the pilot signal at 300 Hz. provides a signal which is well below the lowest data spectrum frequency at 600 Hz. and thus the pilot may be filtered with a low-pass filter having a sufficient bandwidth to reproduce the phase modulation of the pilot introduced by the jitter in the channel. Since the phase modulation introduced is of small index only the first order sidebands need be passed by the filter and a relatively simple filter may be employed to pass sidebands up to ±25 Hz. from the 300 Hz. tone frequency. With such a filter arrangement, the phase jitter at rates up to 20 Hz. superimposed upon a translation of ±5 Hz. may be readily tracked. Since the pilot tone is generated by modulating the carrier with an offset carrier frequency and isolating the lowest sideband, then the recovery filter in the demodulation system need only pass a single-frequency band, centered on the frequency of offset, despite use of different carrier frequencies. With a 3,000 Hz. carrier and a data rate of 4,800 binits/sec., the lowest edge of the data signal band is at 600 Hz. If more phase jitter is expected, the data rate may be reduced, for example, to 3,600 binits/sec. thereby increasing the lowest edge of the data spectrum to 1,200 Hz. permitting use of a broader band pilot filter.

In the demodulator, the recovered pilot is translated to the appropriate carrier frequency by means of a phase cancellation single sideband modulator of design similar to that shown in FIG. 5. Thus a local carrier for use in the demodulation of the incoming data signals has been generated with the phase uncertainty introduced by the channel corrected. The second source of phase uncertainty is that introduced by the carrier synthesizer itself. This phase uncertainty includes as one component, uncertainty introduced by the pilot recovery filter. Even if this filter has a precisely calibrated phase shift at its center frequency of 300 Hz., the frequency translation introduced in the channel will result in phase uncertainty produced by this filter. The second type of phase uncertainty introduced in the synthesizer is due to the uncertainty of the phase of the locally generated offset carrier frequency $F_{OC}$ which is used to translate the recovered pilot tone to the carrier frequency. In order to correct for these uncertainties the demodulator system of this embodiment includes a phase lock loop in which the phase is servoed to maximize the clustering of zero crossings of the demodulated eye pattern. At optimum phase the data signal zero crossings are tightly grouped. By utilizing a system which provides an output signal related to the quality of this grouping to control the phase of the locally generated offset carrier, the phase uncertainties from this second source are corrected.

Figure 9:
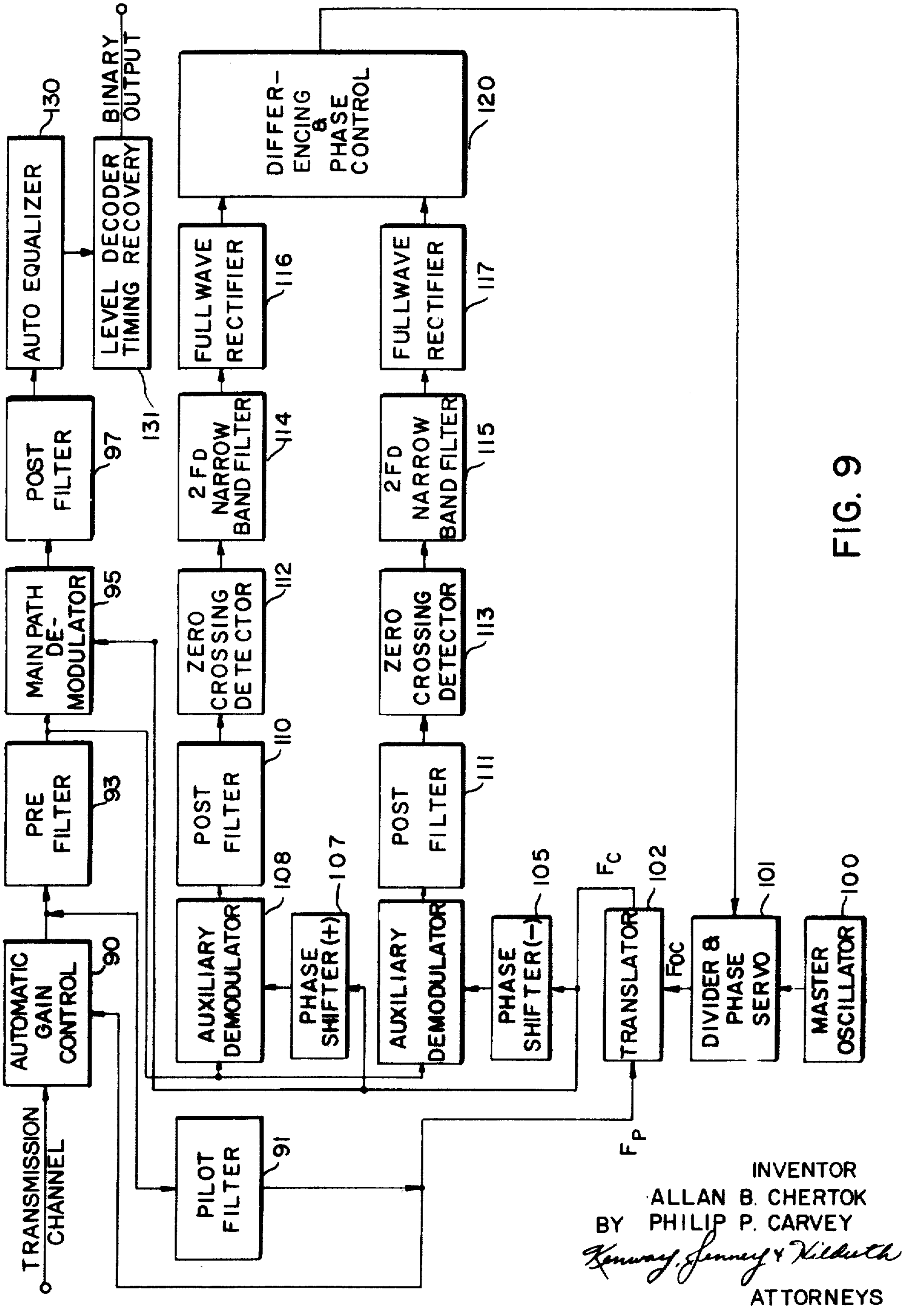
FIG. 9 is an illustration in block diagrammatic form of a data transmission receiver constructed in accordance with the principles of this invention.

In FIG. 9 there is illustrated a demodulating system to demodulate the signal transmitted over the transmission channel and correct for these phase uncertainties. The input from the transmission channel is applied through an automatic gain control circuit 90 and thence through a prefilter 93 to a main path demodulator 95. The automatic gain control circuit may be conventional such as a photoresistor controlled circuit. The output of the main path demodulator 95 is passed through a post filter 97 and an autoequalizing circuit 130 to a level decoder and timing recovery circuit 131, the latter providing the binary output from the demodulator. The output from the automatic gain control unit 90 is also coupled through pilot filter 91 to translator 102. The translator 102 receives an offset carrier signal $F_{OC}$ from a divider and phase servo unit 101. The divider and phase servo unit 101 receives one input from a differencing and phase control unit 120.

The carrier frequency $F_C$ output of the translator 102 is applied as the carrier input to the main path demodulator 95. The phase lock loop receives the synthesized carrier frequency, $F_C$, through a pair of phase shift elements 105 and 107. The carrier frequency passed through the phase shift element 105 is supplied as the carrier frequency to an auxiliary demodulator 109 which receives as its signal input the output from the prefilter 93. The output of this auxiliary 109 is provided through post filter 111 to a zero crossing detector 113 which provides output pulses for each zero crossing of the baseband data signal, including those which occur at the half-period. The output pulses from this zero-crossing detector 113 are applied through a narrow band filter 115, centered at a frequency $2F_D$, to a full-wave rectifier 117 and then to a differencing and phase control circuit 120. The second channel of the phase lock loop is similar to the first except that the carrier signal $F_C$ is supplied through a positive phase shift element 107 as the carrier for the auxiliary demodulator 108. The output of this auxiliary demodulator 108 is applied through a post filter 110 to a zero cross detector 112, whose output is applied through a $2F_D$ narrow band filter 114 and a full-wave rectifier 116 to the differencing and phase control unit 120.

The functional operation of the demodulator circuit of FIG. 9 is as follows. The transmitted signal passed through the automatic gain control unit 90 is filtered at the pilot filter 91 to isolate the pilot tone at 300 Hz. This pilot tone is fed back to the automatic gain control unit 90 to provide for amplitude gain control. The amplitude corrected signal from the gain control unit 90 is passed through the prefilter 93, which simply is a low-pass filter eliminating high frequency noise from the signal, to the main path demodulator 95. Demodulator 95 is a conventional demodulator which receives its carrier signal from the translator 102 and, after demodulation the recovered baseband spectrum is passed through a filter 97, which is a low-pass filter and thence through a conventional autoequalizing circuit 130 to the level decoder and timing recovery unit 131. The level decoder and timing recovery unit provide for the slicing of the doublet symbol at times synchronized to the eye openings and thereby provide the regenerated binary output train. The timing recovery is arranged by generating the clocking pulses at both the transmitter symbol generator and at the receiver decoder from precise crystal controlled oscillators (not shown), and locking the phase of the receiver clock to full period zero crossings of the baseband data signal.

The remainder of the circuit of FIG. 9 provides for the generation, with precise phase relationship, of the local carrier for the demodulation taking place in the main path demodulator 95. This carrier is synthesized by taking the output of a master oscillator 100, which is divided down by a divider and phase servo unit 101 to generate an offset carrier frequency $F_{OC}$, precisely equal in frequency to the offset carrier generated at the transmitter modulator. In order to ensure that the offset carriers are precisely identical in frequency, identical master oscillators divided down by the same factor are employed. The offset carrier frequency $F_{OC}$ is provided to the translator 102, which has as its signal input the output from the pilot filter 91, representing the offset pilot tone. Translator 102 generates as an output the upper sideband, which is therefore the sum of the offset carrier and the input pilot tone. This output designated $F_C$ is provided as the carrier frequency to the main path demodulator 95. The synthesized carrier frequency $F_C$ includes corrections for the channel frequency translation and phase jitter since the pilot tone recovered from the pilot filter 91 includes these shifts.

The phase shift introduced by this pilot filter 91 and also the uncertainty introduced by the phase of the master oscillator 100 is corrected for in the phase lock loop. The mechanism of the phase lock loop is to servo the phase servo unit 101 to maintain the highest density of zero crossings. This is accomplished by shifting the phase of the carrier applied to each of the channels in the phase lock loop, with respect to the phase of the synthesized carrier $F_C$. Thus phase shift element 105 shifts the phase of the carrier negatively, while the element 107 shifts the phase positively. With the phase shifted carrier frequencies, each channel then demodulates the input signal, passes it through a low-pass filter to remove noise and upper sidebands and applies the demodulated signals to a zero crossing detector. The zero crossing detector detects whenever the eye pattern waveform crosses zero and produces a narrow output pulse. This output pulse will be provided not only for the full period zero crossings, but also for the half-period zero crossings which occur during data sequences of consecutive logical 1's. The output from the zero crossing detector is passed through a narrow band filter peaked at $2F_D$ to a full-wave rectifier. The power output from the narrow band filter will be maximum when the zero crossings are mostly tightly clumped, since the filter will be excited at intervals equal to its reciprocal resonance frequency. Accordingly, the voltage level from the full-wave rectifier which is proportional to filter output power at $2F_D$ will also be maximized when the zero crossings are most closely clumped.

When the difference between the output from the full-wave rectifier 116 in the positive phase shifted channel and the full-wave rectifier 117 in the negative phase shifted channel is minimum the carrier frequency phase is locked at a value providing maximum clumping of the zero crossings. The differencing and phase control circuit 120 provides an output to the phase servo unit 101 representing the difference between the outputs of the full-wave rectifiers and drives this servo to change the phase of the offset carrier $F_{OC}$ in a direction governed by the polarity of the difference signal derived from the full-wave rectifier and which minimizes the outputs.

The phase servo unit 101 may take any one of several forms. For example, it may simply be a gating arrangement whereby master oscillator pulses at the input to the divider are gated out to retard the phase of the offset carrier or additional pulses are inserted to advance the phase of the carrier.

The overall system described in this preferred embodiment then provides for the transmission of binary data over band limited channels with corrections for phase errors introduced by the channel and for phase uncertainties introduced by the generation of the local carrier frequency at the demodulator. The use of the digitally generated waveforms for the phase cancellation method of generating single sidebands very considerably simplifies and makes economical the filtering requirements of the system and permits operation at a multiplicity of data rates and carrier frequencies.

We claim:

1. A data transmission system for transmitting digital data occurring at a rate $F_D$, comprising:
- a first digitally operated symbol generator responsive to the digital data at the rate $F_D$ to produce a series of analog waveforms;
- a second digitally operated symbol generator, responsive to the digital data, for generating, simultaneously with the series of waveforms from the first symbol generator, a series of waveforms which are the Hilbert transform of the waveforms produced by the first symbol generator;
- means for generating a first carrier signal at a predetermined frequency and phase, and a second carrier signal at the same frequency in quadrature phase relation to the first carrier signal;
- means for generating third and fourth carrier signals of identical frequency, said third and fourth carrier signals being quadrature related;
- a first balanced modulator having the output of said first symbol generator and the third carrier signal applied as its modulating input and said first carrier signal applied as its carrier input;
- a second balanced modulator having the output of said second symbol generator and the fourth carrier signal applied as its modulating input and said second carrier signal as its carrier input;
- a summing circuit, the output of said first balance modulator and the output of said second balance modulator being applied as inputs to said summing circuit, the output of said summing circuit being transmitted as a single sideband suppressed carrier signal transmitting said digital data;
- the third and fourth carrier signal frequency being offset from the first and second carrier signal frequency by an amount such that modulating the first and second carrier frequency with the offset carrier frequency produces a lower sideband pilot tone at a frequency less than the minimum frequency of the single sideband data signal.

2. A transmission system in accordance with claim 1 and further including a low-pass filter coupled to the output of said summing circuit for isolating said single sideband suppressed carrier signal.

3. A data transmission system in accordance with claim 2 wherein said first symbol generator produces a series of output waveforms of the form $$S(t)=1/2\left[\frac{\sin \pi(T+t)}{\pi(T+t)}-\frac{\sin \pi(T-t)}{\pi(T-t)}\right]$$

where $t$= instantaneous time and $T=1/F_D$= interval between bits of said digital data.

4. A transmission system in accordance with claim 1 and further including a receiver and a band limited transmission channel coupled between the output of said summing circuit and said receiver, said receiver comprising, a pilot filter for separating said pilot tone from the received transmitted signal, a first demodulator for recovering said series of analog waveforms from said received transmitted signal, means for coupling said received transmitted signal both to the input of said pilot filter and to the input of said demodulator, means for generating a local offset carrier having a frequency identical to the frequency of said third and fourth carrier signals, a carrier translator for translating said recovered pilot tone upward in frequency by the amount of said offset carrier frequency, said translator having one input from said pilot filter and a second input from said means for generating the offset carrier, the output of said translator being supplied as a synthesized carrier frequency to said demodulator.

5. A transmission system in accordance with claim 4 wherein said first symbol generator produces a series of output waveforms of the form $$S(t)=1/2\left[\frac{\sin \pi(T+t)}{\pi(T+t)}-\frac{\sin \pi(T-t)}{\pi(T-t)}\right]$$

where $T=1/F_D$ and $t$= instantaneous time

6. A transmission system in accordance with claim 5 including an automatic gain control circuit within said coupling means, the output of said pilot filter being coupled to said automatic gain control circuit to control the amplitude of the signal transmitted to said first demodulator.

7. A transmission system in accordance with claim 5 wherein said pilot filter is a low-pass filter.

8. A data transmission system in accordance with claim 5 and further including, a phase locking means in said receiver for maintaining the phase of said synthesized carrier signal in fixed relation to the phase of the received transmission signals, said phase locking system including, a phase adjusting element coupled to said means for generating an offset carrier to adjust the phase of the generated offset carrier, a transition detector for detecting when said received waveform crosses a predetermined voltage level, and means responsive to the output of said transition detector for adjusting the phase of the locally generated offset carrier in a direction tending to maximize the number of crossings occurring at a periodic rate which is an integer multiple of the digital data rate $F_D$.

9. A data transmission system in accordance with claim 8 wherein said phase locking loop comprises, first and second channels, each of said channels including an auxiliary demodulator having as an input the received transmitted signal, the output of each of said demodulators being connected to a transition detector, the output of each said transition detector being connected through a narrow band filter having a center frequency at $2F_D$ to respective full wave rectifiers, and phase-shifting means for shifting the synthesized carrier from said translator a small amount in a first direction and applying said phase-shifted carrier as the carrier input to the demodulator in said first channel and for phase shifting said synthesized carrier in the opposite direction and applying said oppositely shifted carrier as the carrier input to the demodulator in said second channel, and a phase control circuit coupled to the output of the full-wave rectifiers in said first and second channels and generating an output signal related to the difference between the out puts from said full-wave rectifiers and applying said control signal to said offset carrier generator to adjust the phase of said offset carrier in a direction to minimize the difference between the outputs from said rectifiers.

10. A data transmission system for transmitting a series of digital signals of the form $a_1, a_2 \ldots a_n$, occurring at a predetermined rate $F_D$ comprising, means for converting said series of digital signals into a series of control signals of the form $b_1, b_2 \ldots b_n$, wherein $b_n=(a_n+b_{n-1})$ mod. 2, digitally operated means for producing simultaneously a first and second series of analog waveforms, said first series of waveforms having approximately the form $$S(t)=1/2\left[\frac{\sin \pi(T+t)}{\pi(T+t)}-\frac{\sin \pi(T-t)}{\pi(T-t)}\right]$$

where $T=1/F_D$ and $t$=instantaneous time and said second series of waveforms being the Hilbert transform of the first series of waveforms, said digitally operated means for producing the analog waveforms comprising, a shift register having a data input, a plurality of sequential storage positions, and clocking means for sequentially shifting an actuating signal at said data input through each of said storage positions;

a first series of individual current generating means each connected to one of said storage positions, each of said first series of current generating means producing a specific current signal whenever said actuating signal is at the associated storage position, a first summing terminal for summing all of the current produced by said current generators at any one time, and means for bandlimiting the summed current signal allowing only transmission of baseband components in the frequency region O to $F_D/2$ Hz. said bandlimiting means providing as an output said first series of waveforms, a second series of individual current generating means each connected to one of said storage positions, each of said second series of current generating means producing a specific current signal whenever said actuating signal is at the associated storage position;

a second summing terminal for summing all of the currents produced by said second series of current generators at any one time, and means for bandlimiting the summed current signal allowing only transmission of baseband components in the frequency region O to $F_D/2$ Hz., said bandlimiting means providing as an output said second series of waveforms, p1 means for coupling said control signals to the data input of said shift register;

means for producing a first carrier signal at a predetermined frequency and phase and a second carrier signal at the same frequency in quadrature phase relation to the first carrier signal, first and second balanced modulators, said first summing terminal being connected as the modulating input to said first balanced modulator and said second summing terminal being connected to the modulating input of said second balanced modulator, said first carrier signal being connected as the carrier signal to said first balanced modulator and said second carrier signal being connected as the carrier signal to said second balanced modulator; and an output summing circuit, the output of said first balanced modulator and the output of said second balanced modulator being applied to inputs to said output summing circuit, the output of said summing circuit being transmitted as a single sideband suppressed carrier signal transmitting said digital data.

11. A data transmission system in accordance with claim 10 wherein said clocking means provides signals for shifting the actuating signal through each of said storage positions at a rate equal to $4F_D$ and wherein there are 40 of said storage positions.

12. A data transmission system in accordance with claim 10 and including means for generating third and fourth carrier signals in quadrature relation and having identical frequencies, the frequency of said third and fourth carrier signals being offset from said first and second carrier signal frequency by an amount such that modulating said first and second carrier frequency with said offset carrier frequency produces a lower sideband at a frequency less than the minimum frequency of the single-sideband data signal, said third carrier signal being supplied as a modulating input to said first balanced modulator and said fourth carrier signal being supplied as a modulating input to said second balanced modulator.